(12) United States Patent
Kuipers (10) Patent No.: US 9,973,634 B2
(45) Date of Patent: May 15, 2018

(54) DATA PROCESSING IN A DIGITAL SUBSCRIBER LINE ENVIRONMENT

(71) Applicant: Adtran Inc., Huntsville, AL (US)

(72) Inventor: Martin Kuipers, Dallgow-Döberitz (DE)

(73) Assignee: Adtran Inc., Huntsville, AL (US)

( * ) Notice: Subject to any disclaimer, the term of this patent is extended or adjusted under 35 U.S.C. 154(b) by 0 days. days.

(21) Appl. No.: 14/518,680

(22) Filed: Oct. 20, 2014

(65) Prior Publication Data

US 2015/0319312 A1 Nov. 5, 2015

(30) Foreign Application Priority Data

May 5, 2014 (EP) .................... 14167069

(51) Int. Cl.
*H04M 11/06* (2006.01)
*H04M 3/00* (2006.01)
*H04L 5/14* (2006.01)

(52) U.S. Cl.
CPC ......... *H04M 11/062* (2013.01); *H04L 5/1438* (2013.01); *H04M 3/007* (2013.01)

(58) Field of Classification Search
None
See application file for complete search history.

(56) References Cited

U.S. PATENT DOCUMENTS

| | | | | |
|---|---|---|---|---|
| 6,829,252 B1 * | 12/2004 | Lewin | ................ | H04L 12/2856 370/467 |
| 2004/0114677 A1 * | 6/2004 | Langberg | ................ | H04B 3/32 375/222 |
| 2006/0062288 A1 * | 3/2006 | Hester | ..................... | H04B 3/32 375/222 |
| 2007/0248181 A1 * | 10/2007 | Clausen | ................ | H04B 15/02 375/285 |
| 2008/0117935 A1 * | 5/2008 | Gyselinck | ............... | H04L 49/40 370/488 |
| 2012/0243589 A1 * | 9/2012 | Desjardins | .............. | H04L 7/005 375/222 |
| 2014/0233710 A1 * | 8/2014 | Tu | .......................... | H04B 3/487 379/32.04 |
| 2014/0307749 A1 * | 10/2014 | Liang | ................ | H04L 27/2601 370/509 |
| 2015/0139287 A1 * | 5/2015 | Chef | ..................... | H04L 5/1438 375/222 |
| 2015/0163350 A1 * | 6/2015 | Shi | ...................... | H04M 11/062 379/1.03 |

* cited by examiner

*Primary Examiner* — Maria El-Zoobi
(74) *Attorney, Agent, or Firm* — Fish & Richardson P.C.

(57) ABSTRACT

Methods, systems, devices, and computer readable medium for processing data in a digital subscriber line environment are disclosed. In one aspect methods include establishing a first data channel in a first system utilizing a first frequency band. Methods also include conveying, for a second system that establishes a second data channel over a second frequency band, handshake information using the first system.

24 Claims, 5 Drawing Sheets

DATA PROCESSING IN A DIGITAL SUBSCRIBER LINE ENVIRONMENT

CROSS-REFERENCE TO RELATED APPLICATIONS

This application claims the benefit under 35 U.S.C. § 119(a) of Patent Application No. EP14167069 entitled "Data processing in a digital subscriber line environment," filed May 5, 2014, which is incorporated herein by reference in its entirety.

BACKGROUND

This document relates to data processing in a digital subscriber line environment. DSL or xDSL is a family of technologies that provide digital data transmission over the wires of a local telephone network.

xDSL technologies, e.g., ADSL G.992.1, ADSL2plus G.992.5, VDSL2 G.993.2, vectored VDSL2 G.993.2 and G.993.5 ("G" referring to an ITU-T recommendation), are applied for high speed Internet services. During network upgrades, new generation technology (e.g., VDSL2 or vectored VDSL2) may be deployed to provide higher data rates to subscribers. While typical downstream service rates for ADSL2plus are up to 16 Mbit/s, vectored VDSL2 can provide 100 Mbit/s. In case new systems or technology generations are introduced, it is beneficial that the new service can coexist with legacy technology and legacy subscribers without any detrimental impact on the service quality (e.g., data rate).

SUMMARY

In order to overcome this problem, a method is provided for processing data in a digital subscriber line environment comprising at least one network element, wherein the network element includes a first system utilizing a first frequency band and a second system utilizing a second frequency band, the method comprising the step: conveying a handshake information of the second system via the first system.

This approach allows for conducting a handshake for the second system. This handshake is an adapted (or modified) handshake compared to the handshake according to G.994.1.

The first system may be a low-frequency (LF) system and the second system may be a high frequency (HF) system. This, however, is only an option and the first and second systems may utilize frequency bands without such limitation.

This solution has the advantage that the handshake of the second system does not require sending tones that fall in the range of the first frequency band and avoids any disturbance of the first system by the second system. Also, the solution presented allows the adapted handshake to be fast, because the infrastructure of the first system may be used.

Each of the first and second system may include a transceiver that is arranged for operating in the respective first or second frequency band.

In an embodiment, the handshake information includes at least one of the following: a handshake message based on or equivalent to G.994.1, a message used for handshake purposes, a message used for handshake purposes to determine a communication capability of the second system, a message of a handshake protocol, or at least one frequency used for conducting a handshake as set forth in G.994.1.

In another embodiment, the second frequency band is at least partially or completely above the first frequency band. Hence, the first system may operate on lower frequencies as does the second system. The first frequency band may in particular cover all or a substantial amount of frequencies that are used as handshake tones pursuant to G.994.1.

It is noted that G.994.1 references an ITU-T recommendation "Handshake procedures for digital subscriber line transceivers". Hence "G.994.1" may be understood as a recommendation directed to handshake procedures for DSL systems, in particular DSL transceivers.

In a further embodiment, the second frequency band is at least partially or completely below the first frequency band. It is noted that the first frequency band and the second frequency band may include disjoint (e.g., separate) frequencies or frequency ranges. As an option, the first frequency band and the second frequency band may at least partially include overlapping frequencies.

In some implementations, methods further include conveying the handshake information of the second system via at least one frequency of the first system. Hence, the second system may use the first system as a proxy for conducting a(n adapted) handshake, in particular for sending tones as defined in G.994.1

In some implementations, methods further include conveying the handshake information of the second system via a data channel of the first system. Hence, the data channel of the (already running first system) can be used for conducting the adapted handshake process of the second system. The data channel may be a communication channel that may be available after the first system entered showtime.

In some implementations, the method includes, prior to using the data channel of the first system, conducting a handshake of the first system based on G.994.1 and initializing the first system. As a result of the initialization, the first system may reach showtime.

In some implementations, methods further include conveying the handshake information of the second system across the first system via Ethernet frames, e.g., HDLC frames that are encapsulated in the Ethernet frames.

In some implementations, the first system and/or the second system is one of the following an ADSL system, a VDSL system, a vectored xDSL system, or a G.fast system.

It is noted that xDSL may refer to any DSL system. The VDSL system includes also VDSL-alike systems, e.g., VDSL2. Also, different profiles may be used for each of the xDSL systems, e.g., VDSL2 profile 17a, VDSL profile 30a, etc. The same applies for ADSL systems. It is further noted that the examples described herein may in particular use vectored systems.

In some implementations, the network element is a decentrally deployed device, such as a customer premises equipment, or a central device, such as a digital subscriber line access multiplexer (DSLAM).

A centralized unit may be any entity comprising at least one modem, in particular several modems, to be connected to a modem of a decentralized unit. The centralized unit may be a DSLAM or a central office (CO). The decentralized unit may be a customer premises equipment (CPE). According to an embodiment, the DSLAM may be deployed at a central office or at a cabinet.

In some implementations, methods further include initializing the second system. As a result of the initialization, the first system may enter showtime.

In some implementations, a device includes a first system utilizing a first frequency band; a second system utilizing a second frequency band; and a processing unit that is arranged for conveying a handshake information of the second system via the first system.

It is noted that the steps of the method stated herein may be executable on this processing unit or device as well. It is further noted that said processing unit can include at least one, in particular several means that are arranged to execute the steps of the method described herein. The means may be logically or physically separated; in particular several logically separate means could be combined in at least one physical unit.

Said processing unit may include at least one of the following: a processor, a microcontroller, a hard-wired circuit, an ASIC, an FPGA, a logic device. In some implementations, the first system includes a first transceiver that is connected via a low pass filter to a line; and the second system includes a second transceiver that is connected via a high pass filter to the line.

The low pass filter and the high pass filter may be deployed in a diplexer. The cutting frequency of the low pass filter may substantially correspond to the cutting frequency of the high pass filter. In particular, based on filters, the transceivers may utilize different frequency bands over the line.

In some implementations, the device is a network element, in particular a de-centrally deployed device, in particular a customer premises equipment, or a central device, in particular a digital subscriber line access multiplexer.

In some implementations, a system includes two devices, such as two network elements, e.g., a CPE and a DSLAM, wherein the system is arranged to conduct a handshake process based on G.994.1 between the first systems of the two devices and to conduct an adapted handshake based on G.994.1 by exchanging the handshake information between the second systems In some implementations, a computer program product directly loadable into a memory of a digital computer and executable by one or more devices, includes software code portions that upon execution cause the one or more devices to perform operations described herein.

In some implementations, computer-readable medium, e.g., storage of any kind, is encoded with computer-executable instructions that upon execution cause a computer system to perform operations described herein.

In some implementations, a communication system includes at least one device as described herein.

In some implementations, a device includes a first system utilizing a first frequency band; a second system utilizing a second frequency band; and means for conveying a handshake information of the second system via the first system.

Problems solved by (and/or advantages of) the subject matter of this application include providing an efficient solution for conducting a handshake process using LF systems and HF systems in an xDSL environment that may utilize a single line.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When service providers deploy vectored VDSL2, all DSL lines that can potentially generate FEXT in vectored bands may have to be considered during crosstalk cancellation. Hence, if a VDSL2 profile 30a shall be deployed to provide new premium services with higher data rates in an environment where vectored VDSL2 profile 17a was already deployed, both systems share the same frequency bands up to 17.6 MHz. In case crosstalk from VDSL2 profile 30a loops that is coupled into the vectored VDSL2 profile 17a system is not cancelled, the performance of the vectored system will be severely degraded. Crosstalk cancelation between the VDSL2 profile 17a and VDSL2 profile 30a systems is complex and difficult to realize due to the different tone spacings (4.3125 kHz versus 8.625 kHz) and symbol rates (4 k versus 8 k). Therefore, in such situation, the VDSL2 profile 30a system cannot be easily deployed to provide higher data rates.

When two VDSL2 systems share the same line during showtime, there is still the problem of successfully conducting the handshake process based on G.994.1 at the beginning of the initialization. According to ITU-T, showtime is a state that is reached after the initialization procedure has been completed.

The known handshake process uses dedicated tone sets to start the communication between two transceivers. These tone sets consist of two or three upstream and downstream subcarriers that are located in the lower up- and downstream band. Usually, the applied tone set is specific to a region or network and is chosen according to applied band plans (e.g., "B43" in Germany). This universal handshake process is independent of the type of xDSL, even G.fast (based on, e.g., ITU-T G.9700 and/or G.9701) uses the same handshake process and tone sets. The highest specified tone set is "V43" using the following frequencies:

Downstream: 4.0710 MHz; 4.1917 MHz; 4.3082 MHz; and

Upstream: 1.1083 MHz; 1.6517 MHz; 2.2037 MHz.

Also, during handshake, a capabilities list may be communicated or exchanged and/or it may be agreed on a common mode for training and operation.

Hence, if a VDSL2 profile 17a system is considered for a low-frequency (LF) transceiver, all tone sets defined in G.994.1 are below 17.6 MHz and are hence inside the bands dedicated to the LF system. The high frequency (HF) system (e.g., the VDSL2 profile 30a) uses the same frequencies for its handshake process. Hence, the handshake of the HF system interferes with the LF system in case both systems use one physical connection. This problem exists for any HF channel technology that uses the handshake process as defined in or based on G.994.1 or similar low-frequency signaling for the start of the initialization.

Examples provided herein suggest that a HF transceiver of a network element, e.g., a DSLAM or a CPE, does not use the handshake process according to G.994.1 (also referred to as G.hs procedure). In other words, an adapted handshake may be applied for the HF transceiver that may not use tone sets of a low frequency band.

In some implementations, at least one LF transceiver starts its handshake process based on G.994.1 (i.e. in a way as defined in the standard using tone sets (e.g., "B43") that fall within the frequency band of the LF transceiver). Then, the at least one LF transceiver will conduct its initialization and it may reach the showtime state. When showtime is reached, a data channel between the two LF transceivers is established and such data channel can be used to convey user data or other data between the network elements, e.g., between the DSLAM and the CPE.

This data channel is used to perform the transaction required for the adapted handshake process of the HF transceiver. Advantageously, such an adapted handshake process of the HF transceiver may not require using tone sets defined in G.994.1. Instead, equivalent messages between the HF transceivers can be exchanged using the service of the data channel provided by the LF transceivers.

The LF transceiver may multiplex such messages with its ordinary data stream and pass it to the other side. The LF transceiver at the other side may extract the messages comprising handshake data from the data stream received and it may forward the messages to the HF transceiver of the network element. Responses to handshake messages may use the same process in reverse direction. When the handshake process is completed, the HF transceivers may start their normal initialization process as defined in the corresponding recommendation (e.g., G.993.2 or G.9701).

This approach is applicable for any HF channel technology that uses handshake messages or similar low-frequency signaling before starting the initialization (e.g., for VDSL2 or G.fast). The HF channel technology may in particular utilize vectoring. In this regard, the "handshake process" may refers to an "ITU-T G.994.1 handshake phase of the initialization procedure", whereas the initialization refers to the steps conducted after such "handshake process" until the respective system enters showtime. For example, initialization may include a channel discovery phase and a channel analysis and exchange phase.

Figure 1:
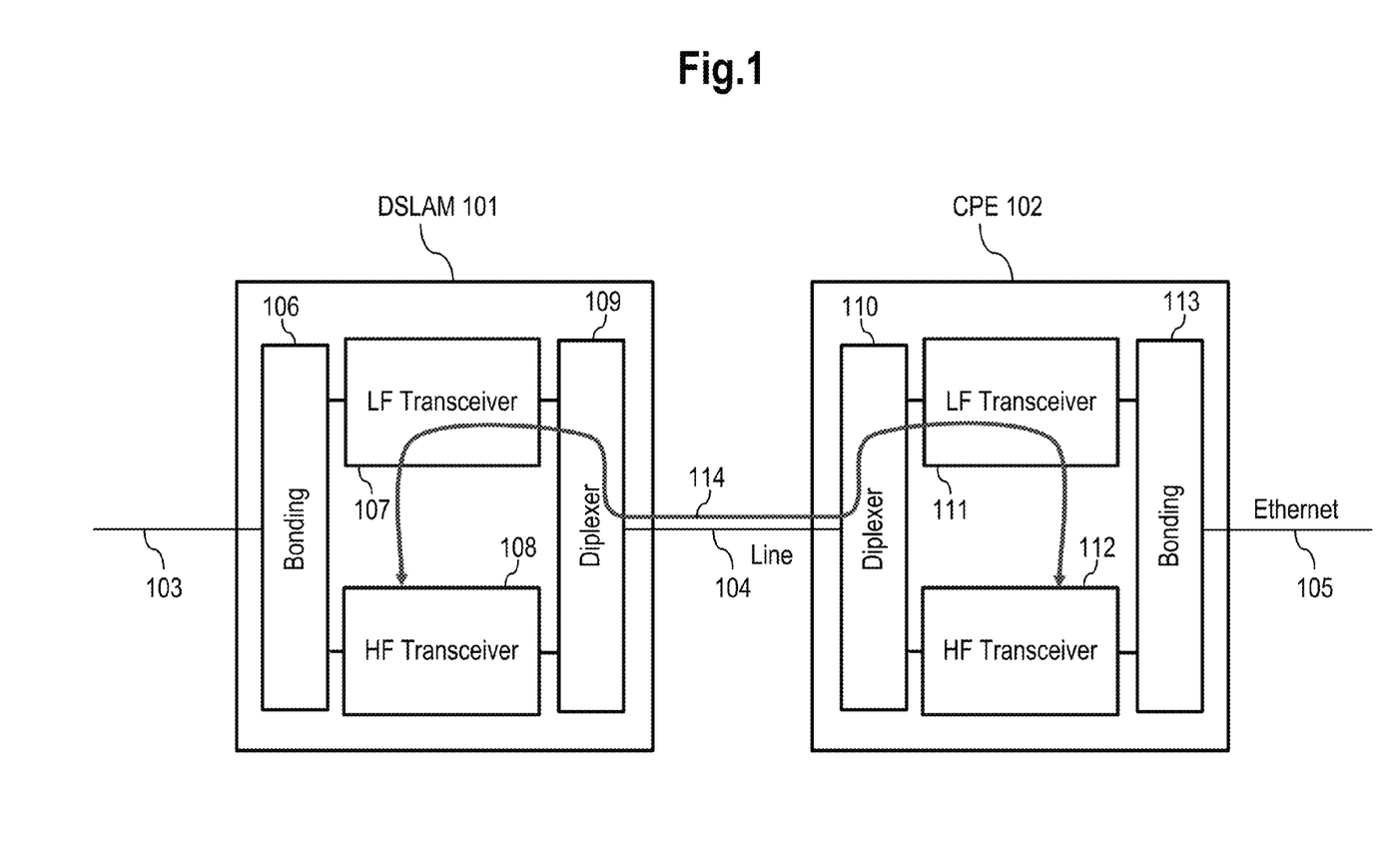
FIG. 1 is a schematic block diagram of two network elements having HF transceivers that communicate with each other via LF transceivers to provide for an adapted handshake.

FIG. 1 shows a schematic block diagram of two network elements, i.e. a DSLAM 101 and a CPE 102, which are connected via a line 104 (i.e. a xDSL line). An Ethernet connection 103 is fed to a bonding unit 106 of the DSLAM 101, to which a LF transceiver 107 and a HF transceiver 108 are connected. The LF transceiver 107 and the HF transceiver 108 are connected to the line 104 via a diplexer 109. The line 104 is connected to a diplexer 110 of the CPE 102, to which a LF transceiver 111 and a HF transceiver 112 are connected. The LF transceiver 111 and the HF transceiver 112 are connected to an Ethernet connection 105 via a bonding unit 113.

It is noted that the Ethernet connection 103 may be supplied via an optical fiber; in such scenario, an optical signal conveyed via said fiber may be fed to a central card that is connected via a backplane to a line card. The central card may convert the optical signal into an electrical signal for processing at the line card. In the opposite direction, the electrical signal is conveyed via the line card to the central card, converted to the optical signal and transmitted via the fiber.

The bonding unit may include a bonding function that may (at least partially) be implemented on the line card, on the central card or separate to the DSLAM or the CPE, e.g., within the network to which the Ethernet connection 103 may be connected.

The bonding unit may utilize "Ethernet in the First Mile" according to or based on IEEE P802.3ah bonding, link aggregation based on IEEE 802.3ad, G.bond according to G.998.x, ATM (Asynchronous Transfer Mode) bonding or PTM (Packet Transfer Mode) bonding.

The DSLAM 101 can be connected to the CPE 102 via at least one line 104, in particular via several physical lines, wherein each line may include two wires. The LF transceiver 107 of the DSLAM 101 may communicate with the LF transceiver 111 of the CPE 102 and the HF transceiver 108 of the DSLAM 101 may communicate with the HF transceiver 112 of the CPE 102.

The LF transceivers 107, 111 may be VDSL2 profile 17a transceivers. The HF transceivers 108, 112 may be any transceiver utilizing a frequency band above 17.6 MHz (e.g., VDSL2 profile 30a transceivers with a high pass band plan or G.fast transceivers).

FIG. 1 in particular visualizes how a combination of LF transceivers 107, 111 and HF transceivers 108, 112 in different network elements 101, 102 may be used to perform a start-up procedure. Such start-up procedure may in particular not involve the HF transceivers 108, 112 using handshake tones according to G.994.1.

The LF transceivers 107, 111 may conduct the handshake process in an common way using handshake messages and an appropriate tone set (for example, B43) according to G.994.1. When showtime is reached between the LF transceivers 107, 111, this may be indicated to the HF transceiver 108 at the DSLAM 101 (CO side).

The LF transceiver 111 at the CPE 102 may also signal to its HF transceiver 112 that the data channel of the LF system has been established. Now, the adapted handshake process for the HF transceivers may commence utilizing the already established data channel of the LF system. Hence, there is no need for a G.994.1 equivalent start-up procedure (C-TONES, R-TONE1, . . . ), so the HF transceivers 108, 112 may directly start exchanging G.994.1 equivalent messages via the data channel of the LF system (in FIG. 1 indicated as connection 114).

Figure 2:
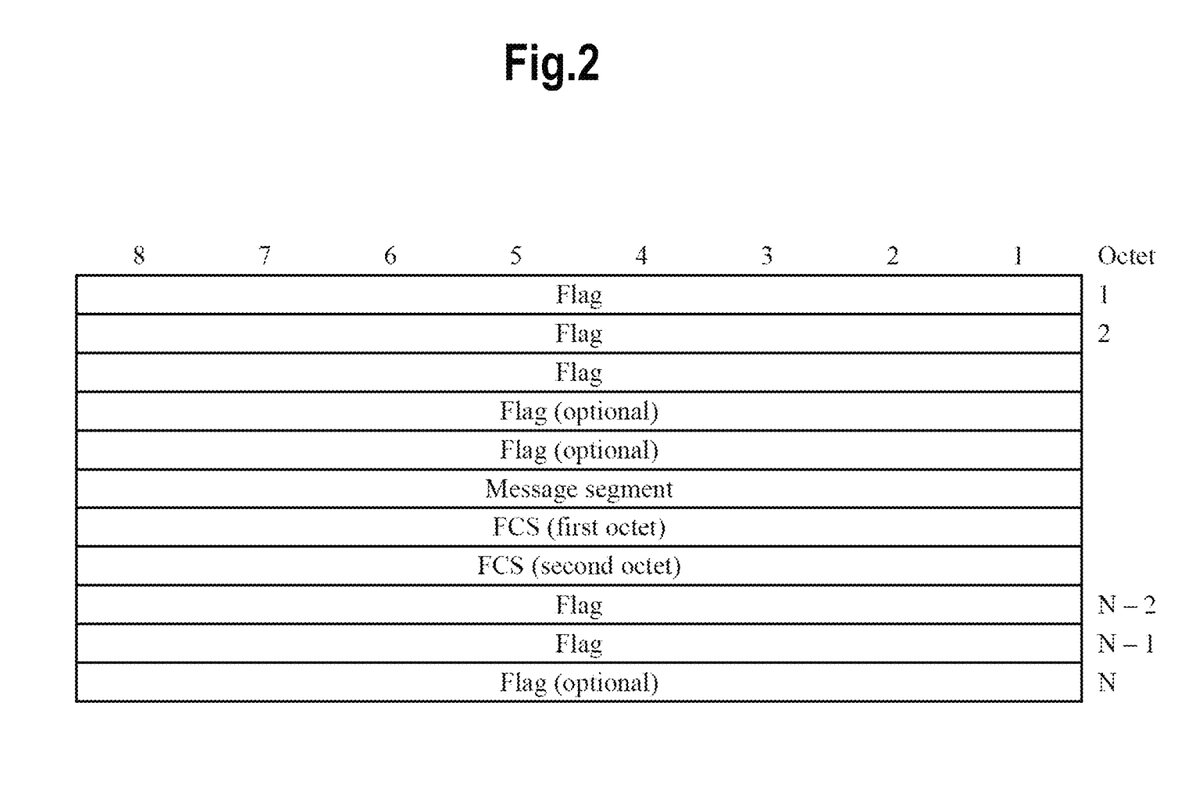
FIG. 2 shows a frame structure according to G.994.1.

FIG. 2 shows a frame structure according to G.994.1. This corresponds to a HDLC frame structure, wherein each frame begins and ends with a standard HDLC flag octet ("01111110"). For the reason of an efficient adaptation to provide the adapted handshake process as suggested herein, the content of such HDLC frame can be encapsulated into an Ethernet frame that is passed between HF transceivers via the LF data channel. In order to identify packages that are directed to the HF transceivers, unique MAC addresses may be used that are dedicated to the individual transceivers (e.g., for the start-up process). Hence, the specific Ethernet frames may be filtered out from user traffic and the filtered frames may be forwarded to the respective transceiver identified by its MAC address (e.g., via a management interface).

Such an Ethernet frame may include a destination MAC address (MAC address of the G.994.1 process of the destination HF transceiver), a source MAC address (MAC address of the G.994.1 process of the source HF transceiver), a length field (as per the IEEE 802.3 MAC frame format), a LLC PDU header coding for the SNAP protocol (3 bytes, AA-AA-03), a SNAP PDU header containing a 3-octet organization code and a 2-octet Protocol ID for a private protocol, a Protocol Payload Data (G.994.1 HDLC frame including Flags, Message segment, FCS), and a standard Ethernet 4-byte FCS (as per the IEEE 802.3 Ethernet frame FCS).

The HF transceivers 108, 112 may then exchange G.994.1 messages using the Ethernet frames described above. The G.994.1 protocol may remain unchanged including ACK and NACK messages.

For example, in case the HF transceiver 112 at the CPE 102 wants to send a Capabilities List and Request (CLR) message to the corresponding HF transceiver 108 at the DSLAM 101, it may encode the CLR message according to G.994.1, wherein each HDLC frame is put in a separate Ethernet frame as described above. The HF transceiver 112 then forwards the Ethernet frames to the LF transceiver 111, which multiplexes the packets with ordinary user data and transmits them via the data channel to the LF transceiver 107 of the DSLAM 101.

The LF transceiver 107 forwards all data received to its network processor. The network processor identifies the packets based on the specific MAC address. The destination MAC address allows the network processor to determine the destination HF transceiver 108 and the network processer may then forward the respective frame (with the destination MAC address of the HF transceiver 108) to the HF transceiver 108.

The HF transceiver 108 decodes the G.994.1 content of the Ethernet frame and prepares a Capabilities List (CL) response. The response Ethernet frames are passed via the network processor of the DSLAM 101 to the LF transceiver 107, which sends it to the LF transceiver 111 of the CPE 102. The network processor of the CPE 102 identifies and forwards the frame from the LF transceiver 111 to the HF transceiver 112. After the adapted handshake is concluded, the initialization process between the HF transceivers 108 and 112 utilizing the respective frequencies of the HF transceivers 108, 112 may begin. After such initialization process, the HF transceivers 108, 112 reach showtime.

Figure 3:
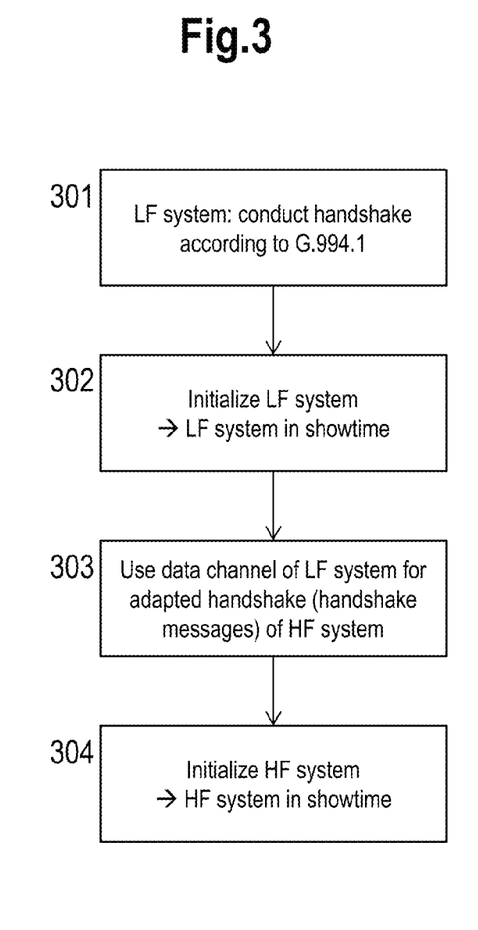
FIG. 3 shows a block diagram illustrating steps for several xDSL technologies deployed in a single network element reaching showtime.

FIG. 3 shows a block diagram illustrating steps for several xDSL technologies (in this example a LF system and a HF system) deployed in a single network element reaching showtime. In a step 301, the LF system conducts the handshake process according to G.994.1 using the tones as defined in G.994.1. In a step 302, the LF system is initialized and thereinafter reaches showtime. In a step 303, the data channel of the LF system (which is available when the LF system is in showtime) is used for an adapted handshake of the HF system. This is achieved by conveying messages equivalent to the messages described in or based on G.994.1 via the data channel of the LF system from one HF system to another HF system (of a different network element). Based on the messages exchanged between the HF systems, the HF system is able to conclude the adapted handshake process. Then, in a step 304, the HF system is initialized and may enter showtime.

This approach has the advantage that no significant (e.g., less than a specified amount of) disturbance due to FEXT or NEXT occurs. Also, the diplexer design is easier and more cost-efficient, because there is no need for passing handshake tones through specific filters. Furthermore, no band pass filters (BPF) are needed. It is also an advantage that the handshake process of the HF system is faster, because of the high data rate of the already established data channel provided by the LF system.

Figure 4:
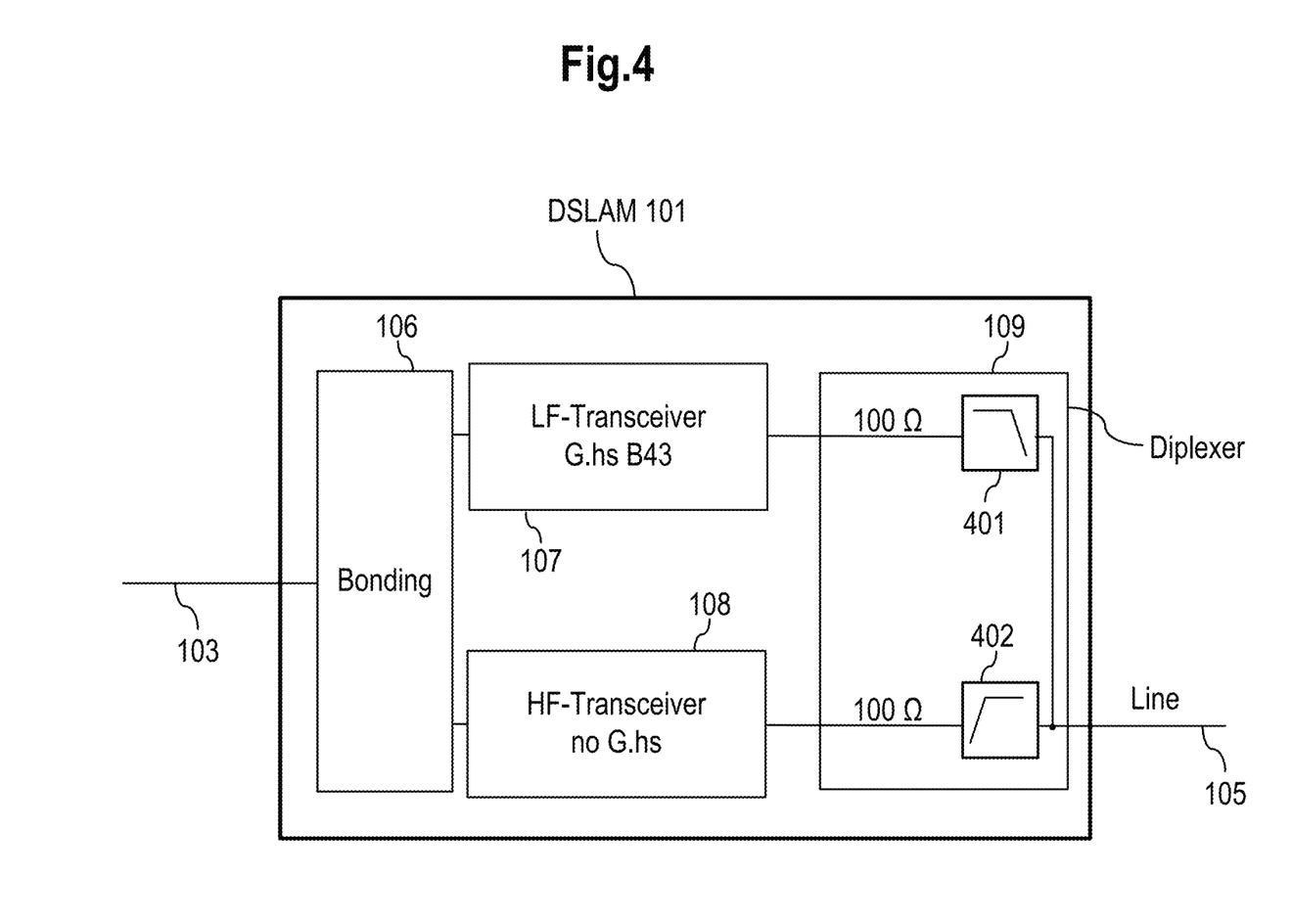
FIG. 4 shows a DSLAM with the units depicted and explained with regard to FIG. 1.

FIG. 4 shows a DSLAM 101 with the units depicted and explained with regard to FIG. 1 above, where the diplexer includes an efficient filter solution.

The LF transceiver 107 is connected via a 100 Ohm line to a low pass filter (LPF) 401 with a cutoff frequency amounting to 17.6 MHz. The HF transceiver 108 is connected via a 100 Ohm line to a high pass filter (HPF) 402 with a cutoff frequency amounting to 17.6 MHz. The outputs of the LPF 401 and the HPF 402 are connected to the line 105. The LPF 401 and the HPF 402 are part of the Diplexer 109.

According to another example, G.fast may be launched from distribution points (DPs) close to the subscriber or from a basement of a building. In a migration scenario, merely G.fast is used. However, it would be beneficial to re-use (existing) hardware (CPEs) comprising a G.fast transceiver (as HF system) and a transceiver of a LF system. Without supporting the LF system, however, there is no handshake for the LF system and no LF system that could reach showtime and supply a data channel for an adapted handshake of the G.fast system. Utilizing a network element that is configured for the adapted handshake of the HF system as described above, the HF system may not be able to conduct a handshake using the tones set forth in G.994.1, because such tones would not get passed the HPF 402 of the diplexer 109.

However, the HF system G.fast can run the adapted handshake without the need of an active LF data channel by utilizing the LF transceiver as a proxy for exchanging handshake messages according to G.994.1.

In such case, the LF transceiver of the CPE may only be used for the handshake process. When the LF transceiver at the CPE detects handshake tones or receives G.994.1 messages it will pass this information directly to the HF transceiver (the G.fast transceiver in this example) via the same packet mechanism described above. The handshake response message from the HF transceiver may be passed via CPE internal data connections to the LF transceiver and the LF transceiver may transmit the messages via G.994.1 tone-based modulation to the G.fast transceiver at the DP. After the handshake process of the HF system using the LF transceiver as a proxy is finished, the LF transceiver may shut down and the HF transceiver may continue with its initialization.

Figure 5:
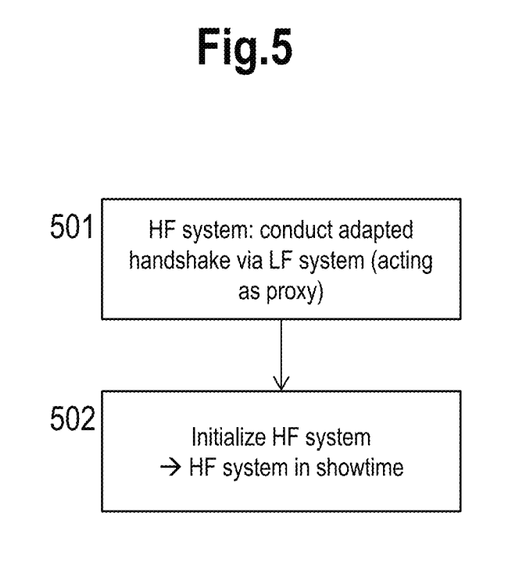
FIG. 5 shows a block diagram illustrating steps for a HF system using a LF system as a proxy.

FIG. 5 shows a block diagram illustrating steps for a HF system deployed in a network element together with a LF system, wherein the LF system is used by the HF system as a proxy. In a step 501, the HF system conducts an adapted handshake process using the LF system as a proxy for conveying tones as set forth in G.994.1. Hence, the LF system is used by the HF system to convey the handshake messages. In a step 502, after the adapted handshake, the LF system may be shut down, the HF system is initialized and may thereinafter reach showtime.

In this scenario, the LF system is not initialized and does not reach showtime. Only, the handshake capability of the LF system is used by the HF system to conduct the adapted handshake of the HF system even without a data channel of the LF system.

Although various embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

LIST OF ABBREVIATIONS

ACK Acknowledgement
ADSL Asynchronous Digital Subscriber Line
BPF Band pass filter
CL Capabilities List
CLR Capabilities List and Request
CO Central Office
CPE Customer Premises Equipment
DP Distribution point
DSL Digital Subscriber Line
DSLAM DSL Access Multiplexer
FCS Frame Check Sequence
FEXT Far-end crosstalk
HDLC High-Level Data Link Control
HF High Frequency
HPF High pass filter
LF Low Frequency
LLC Logical Link Control
LPF Low pass filter
NACK Negative Acknowledgement
NEXT Near-end crosstalk
PDU Protocol Data Unit
SNAP Subnetwork Access Protocol
VDSL Very High Speed Digital Subscriber Line

The invention claimed is:

1. A method for establishing multiple data channels on a same line in a digital subscriber line environment comprising:
    establishing, based on first handshake information transmitted using a given set of tones in a first frequency band that is used to exchange handshake information for each of a first system and a second system, a first data channel in the first system; and
    after establishing the first data channel, establishing, based on second handshake information transmitted over the established first data channel instead of using the given set of tones in the first frequency band that is used to exchange handshake information for the second system, a second data channel in the second system over a second frequency band that differs from the first frequency band, including:
        formatting the second handshake information that establishes the second data channel as one or more data messages of the first data channel; and
        transmitting the one or more data messages that include the formatted second handshake information over the established first data channel to establish the second data channel.

2. The method according to claim 1, wherein the first handshake information comprises at least one of a handshake message based on or equivalent to G.994.1, a message used for handshake purposes, a message used for handshake purposes to determine a communication capability of the second system, a message of a handshake protocol, or at least one frequency used for conducting a handshake as set forth in G.994.1.

3. The method according to claim 1, wherein the second frequency band is at least partially or completely above the first frequency band.

4. The method according to claim 1, wherein the second frequency band is at least partially or completely below the first frequency band.

5. The method according to claim 1, wherein transmitting the formatted second handshake information comprises transmitting the formatted second handshake information of the second system over at least one frequency of the first system.

6. The method according to claim 1, comprising:
    before using the first data channel of the first system:
        conducting a handshake of the first system based on G.994.1; and
        initializing the first system.

7. The method according to claim 1, wherein transmitting the formatted second handshake information comprises transmitting the formatted second handshake information of the second system across the first system in Ethernet frames.

8. The method according to claim 1, wherein the first system or the second system is one of: an ADSL system, a VDSL system, a vectored xDSL system, or a G.fast system.

9. The method according to claim 1, wherein the first system or the second system includes one of a customer premises equipment or a digital subscriber line access multiplexer.

10. The method according to claim 1, further comprising initializing the second system.

11. A device that establishes multiple data channels on a same line, the device comprising:
    a first system that establishes a first data channel based on first handshake information transmitted using a given set of tones in a first frequency band that is used to exchange handshake information for each of the first system and a second system;
    the second system that establishes a second data channel based on second handshake information transmitted over the established first data channel instead of using the given set of tones in the first frequency band that is used to exchange handshake information for the second system after the first system establishes the first data channel, wherein the second data channel is established over a second frequency band different from the first frequency band, wherein the second data channel is established using second handshake information that is formatted as one or more data messages of the first data channel, and wherein the one or more data messages that include the formatted second handshake information are transmitted over the established first data channel to establish the second data channel; and
    a processing unit that causes the second system to convey handshake information used to establish the second data channel using the first system.

12. The device according to claim 11, wherein:
    the first system comprises a first transceiver that is connected via a low pass filter to the same line; and
    the second system comprises a second transceiver that is connected via a high pass filter to the same line.

13. The device according to claim 11, wherein the device is a de-centrally deployed device or a central device.

14. A system that establishes multiple data channels on a same line, comprising two devices that:
    establish, based on first handshake information transmitted using a given set of tones in a first frequency band that is used to exchange handshake information for each of a first system of the two devices and a second system of the two devices, a first data channel in the first system; and
    after establishing the first data channel, establish, based on second handshake information transmitted over the established first data channel instead of using the given set of tones in the first frequency band that is used to exchange handshake information for the second system, a second data channel in the second system over a second frequency band that differs from the first frequency band, including:
formatting the second handshake information that establishes the second data channel as one or more data messages of the first data channel; and
transmitting the one or more data messages that include the formatted second handshake information over the established first data channel to establish the second data channel.

15. A non-transitory computer readable medium encoded with instructions that upon execution by one or more processors cause the one or more processors to establish multiple data channels on a same line, wherein the instructions cause the one or more processors to perform operations comprising:
establishing, based on first handshake information transmitted using a given set of tones in a first frequency band that is used to exchange handshake information for each of a first system and a second system, a first data channel in the first system; and
after establishing the first data channel, establishing, based on second handshake information transmitted over the established first data channel instead of using the given set of tones in the first frequency band that is used to exchange handshake information for the second system, a second data channel in the second system over a second frequency band that differs from the first frequency band, including:
formatting the second handshake information that establishes the second data channel as one or more data messages of the first data channel; and
transmitting the one or more data messages that include the formatted second handshake information over the established first data channel to establish the second data channel.

16. The computer readable medium according to claim 15, wherein the first handshake information comprises at least one of a handshake message based on or equivalent to G.994.1, a message used for handshake purposes, a message used for handshake purposes to determine a communication capability of the second system, a message of a handshake protocol, or at least one frequency used for conducting a handshake as set forth in G.994.1.

17. The computer readable medium according to claim 15, wherein the second frequency band is at least partially or completely above the first frequency band.

18. The computer readable medium according to claim 15, wherein the second frequency band is at least partially or completely below the first frequency band.

19. The computer readable medium according to claim 15, wherein transmitting the formatted second handshake information comprises transmitting the formatted second handshake information of the second system over at least one frequency of the first system.

20. The computer readable medium according to claim 15, wherein the instructions cause the one or more processors to perform operations comprising:
before using the first data channel of the first system:
conducting a handshake of the first system based on G.994.1; and
initializing the first system.

21. The computer readable medium according to claim 15, wherein transmitting the formatted second handshake information comprises transmitting the formatted second handshake information of the second system across the first system in Ethernet frames.

22. The computer readable medium according to claim 15, wherein the first system or the second system is one of: an ADSL system, a VDSL system, a vectored xDSL system, or a G.fast system.

23. The computer readable medium according to claim 15, wherein the first system or the second system includes one of a customer premises equipment or a digital subscriber line access multiplexer.

24. The computer readable medium according to claim 15, wherein the instructions cause the one or more processors to perform operations further comprising initializing the second system.

* * * * *